Inventor
John Ronald Parks
By Cushman, Darby & Cushman
Attorneys

Inventor
John Ronald Parks
By Cushman, Darby & Cushman
Attorneys

Inventor
John Ronald Parks
By Cushman, Darby & Cushman
Attorneys

John Ronald Parks, Inventor
By Cushman, Darby & Cushman
Attorneys

Inventor
John Ronald Parks
By Cushman, Darby & Cushman
Attorneys 3,534,332

ELECTRONIC SYSTEMS AND APPARATUS FOR RECOGNISING PRINTED CHARACTERS

John R. Parks, Teddington, England, assignor to National Research Development Corporation, London, England, a corporation of Great Britain Filed Nov. 14, 1966, Ser. No. 593,973
Claims priority, application Great Britain, Nov. 12, 1965, 48,171/65
Int. Cl. G06k 9/12
U.S. Cl. 340—146.3 13 Claims

ABSTRACT OF THE DISCLOSURE

Apparatus for effecting recognition of printed characters including means for examining a predetermined field area containing the character to be recognised by scanning movement of a spot-form examination area along a raster-like scan path of parallel and equa-spaced lines, means for developing an electric signal waveform representing the differing optical characteristics of the examined character and background areas along the scan path, signal delay means supplied with the signal waveform and adapted to provide a plurality of further similar signal waveforms which are time-delayed by different amounts relative to the developed signal waveform and a plurality of separate means for effecting comparison of different combinations of the signal waveforms, each of the comparison means being arranged to provide an output N-tuple signal indicative of the presence or absence within the examined field area of one of a number of character features of different geometrical shape.

This invention relates to electronic systems and apparatus for effecting recognition of characters, for instance, numerals, which are in printed form such as may be produced as one output from a desk calculator or a cash register.

The object of the invention is the provision of improved arrangements which allow relaxation of the requirements regarding the pitch dimension between successive characters of a group of characters to be recognised, the positioning of the character under examination within the examination field area and the uniformity of character styles.

The invention has particular relation to arrangements of the general kind already described in copending U.S.A. patent applications Nos. 421,314, filed Dec. 28, 1964 by J. R. Parks, and now Pat. No. 3,471,831, and 447,180, filed Apr. 12, 1965, by J. R. Parks et al.

The apparatus for effecting recognition of characters described in the aforesaid applications comprises means for examining a predetermined field area containing the character to be recognised by scanning movement of a spot-form examination area along a raster-like scan path of parallel and equi-spaced lines, means for developing an electric signal waveform representing the differing optical characteristics of the examined character and background areas along said scan path, signal delay means supplied with said signal waveform and adapted to provide a plurality of further similar signal waveforms which are time-delayed by different amounts relative to said developed signal waveform and a plurality of separate means for effecting comparison of different combinations of said signal waveforms, each of said comparison means being arranged to provide an output $n$-tuple signal indicative of the presence or absence within the examined field area of one of a number of character features of different geometrical shape.

In accordance with the present invention a plurality of further means are provided for effecting comparison of different combinations of said $n$-tuple signals, each of said further comparison means being supplied with the $n$-tuple signals relating to the character features present in a different one of the range of characters capable of being recognised and with a timing relative to one another determined by the positional relationship of such features to the aforesaid raster scan path thereby providing an output character identifying signal only when the examined character exhibits each of the chosen character features in the correct physical disposition.

The individual $n$-tuple signals usually contain a substantial noise component and in order to obtain reliable coincidence of the peaks of such signals and also to permit some latitude in the uniformity of the character styles it is desirable to effect some degree of spreading or "blurring" of the $n$-tuple signals so as to extend the area of the feature indicating signal peak, in relation to the scanning raster embracing the examination field area, in both the line scan direction and at right angles thereto.

In order that the nature of the invention may be more readily understood a number of embodiments thereof will now be described by way of illustrative example only and with reference to the accompanying drawings in which:

FIGS. 1 and 2 are graphical diagrams illustrating the scanning of the examination field area with relation to the numerals "2" and "0" respectively.

FIG. 3 comprises a group of waveform diagrams and time scales illustrating the manner of operation of the invention.

FIG. 6 is a further more detailed block schematic diagram showing a preferred form of arrangements for combining different $n$-tuple or character feature indicating signals to determine the character identity, while.

The manner of operation of one system as described in the aforementioned earlier applications will first be briefly described and this will be followed by a description of the modified manner of operation according to the present invention.

Figure 1:
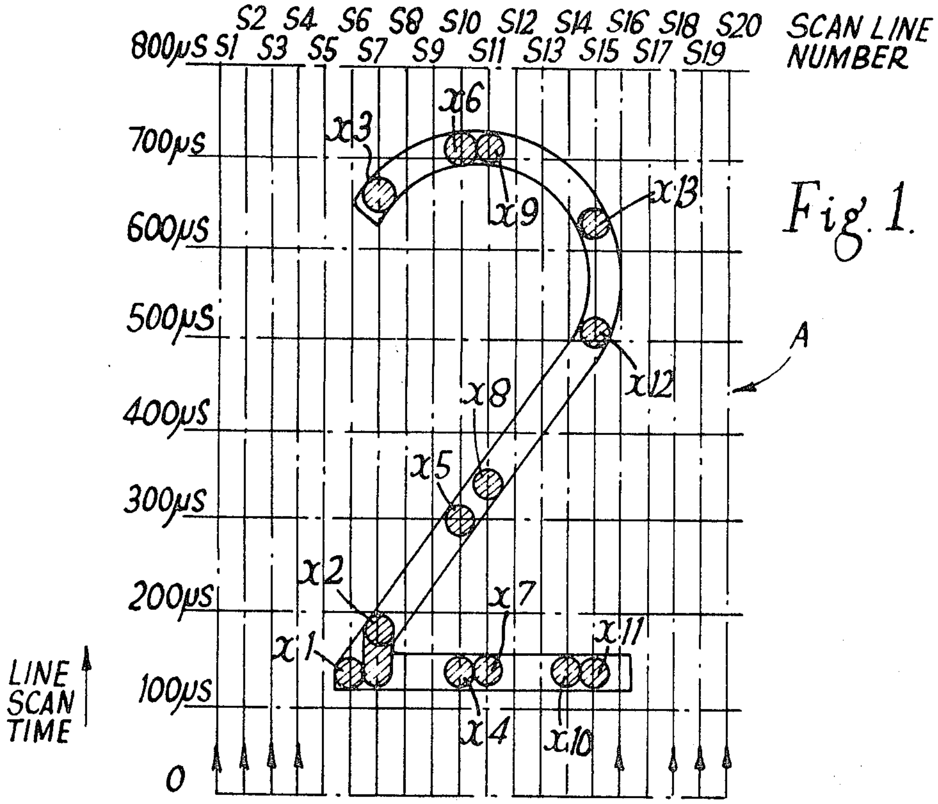
Figure 2:
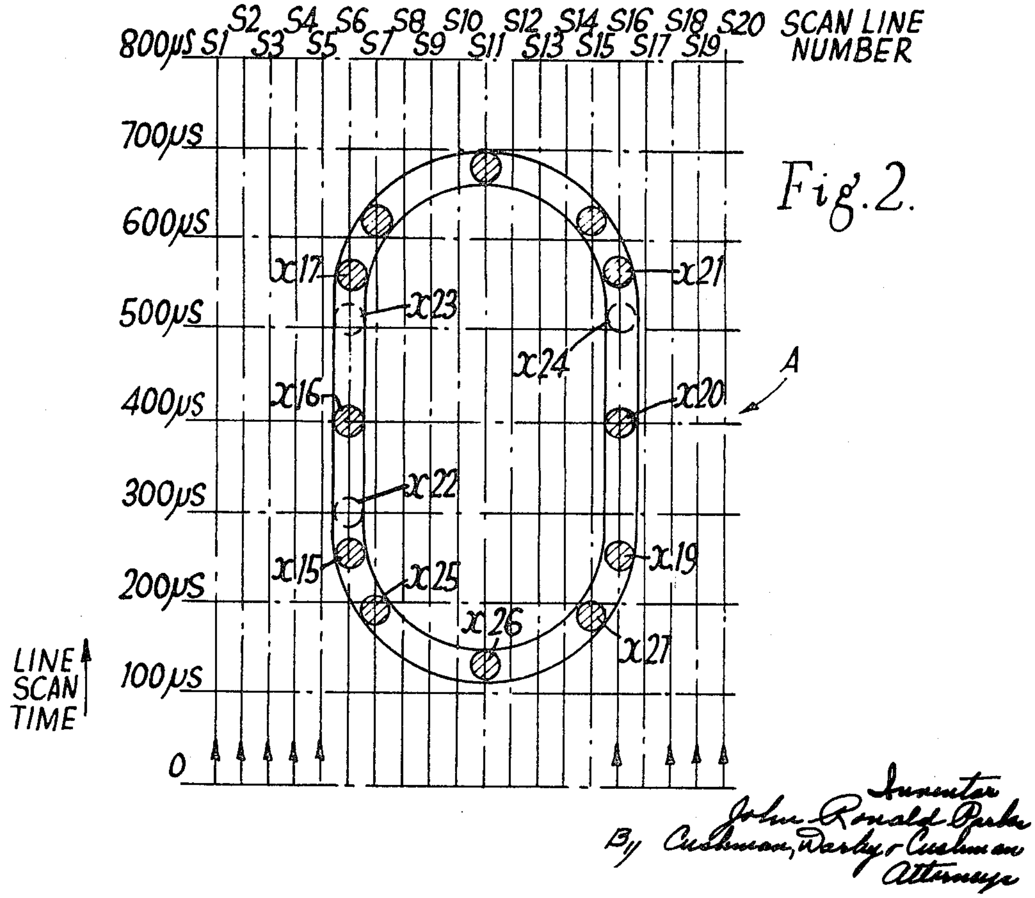

Referring to FIGS. 1 and 2, these illustrate, in simplified diagrammatic form, the examination of character field areas A containing respectively the numeral "2" and the numeral "0" by a scanning light spot moving along a raster-like scan path comprising twenty parallel equi-spaced scan lines $s1$, $s2$ . . . $s20$. For convenience in subsequent description these scan lines are assumed each to have a time duration of 1 millisecond (ms.) of which 800 microseconds ($\mu$s.) are used for the linear scan and the remaining 200 $\mu$s. for the inter-line flyback. Thus, in this example, each character area A is completely scanned in 20 ms. providing a maximum character reading rate of 50 characters/sec. It will be understood that these particular values are given purely for convenience of explanation and the actual values can be varied widely according to the requirements of both the character scanning rate and the number of scan lines per raster.

Figure 3:
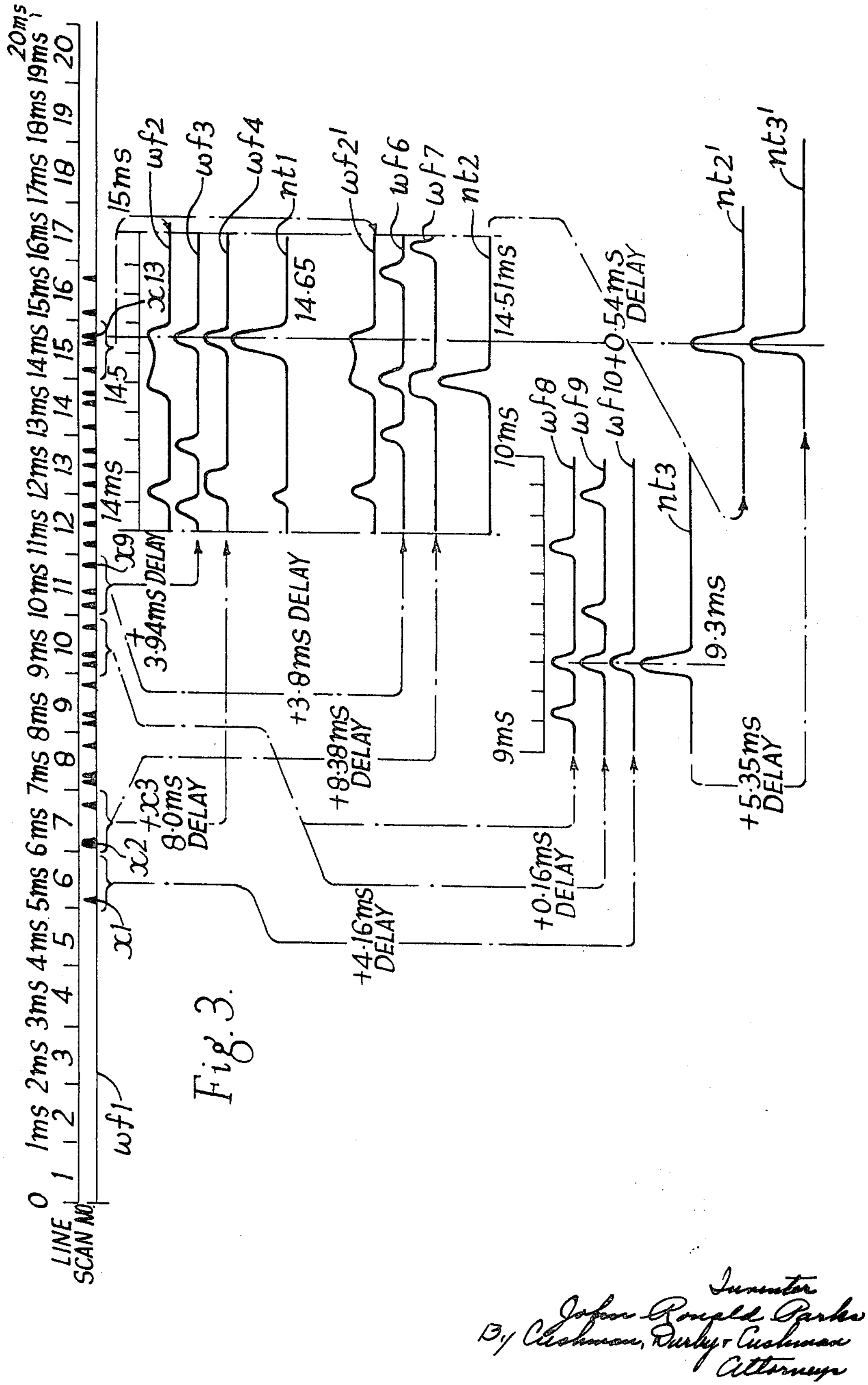

Referring now to FIG. 1 in conjunction with the waveform and timing diagram of FIG. 3, a typical output waveform as obtained from photo-sensing means subject to light from the character area A during the scanning operation is shown in idealized form at $wf1$. Thus during the time of scan lines *s*1 . . . *s*5 no output signals are present whereas scan line *s*6 exhibits an output signal peak consequent upon the passage of the light spot over the area *x*1 at the bottom left hand corner of the numeral. Scan line *s*7 produces similar peaks at time spaced points consequent upon movement of the light spot over the areas *x*2 and *x*3. Similar peaks are produced in the remaining scan lines up to and including scan line *s*16. Scan lines *s*17 . . . *s*20, being clear of the numeral, do not exhibit any signal peaks.

As described in greater detail in the aforesaid earlier applications, by auto-correlating the signals representing different positions along the scan path by multiplying together at least two versions of the same output signal waveform suitably time-displaced by time delay means relative to one another it is possible to establish the presence or absence within the field area A of any one of a number of differently shaped character features, such as vertical lines, horizontal lines, sloping lines, upwardly or downwardly convex hook-shaped portions and angled corners.

For example, as shown by the waveforms *wf*2, *wf*3 and *wf*4, redrawn to a magnified time scale in FIG. 3, if the output waveform (shown at *wf*2) is multiplied by a version of the same waveform delayed relatively thereto by 3.94 ms. (*wf*3) and another version of such waveform delayed relatively to the first by 8.0 ms., the signal outputs corresponding to movement of the light spot over areas *x*3, *x*9 and *x*13 will correspond in time and if, but only if, all of these areas coincide with the examined character, a signal peak will be present in each waveform to provide an "*n*-tuple" output signal (*nt*1) from the multiplying means indicative of the presence of an upwardly convex hook in the character.

It will be noted that, as coincidence of the signal peaks is brought about by imposing time delays on two of the waveform versions relative to the third, the actual physical position of such curved character feature portion within the field area A is quite inmaterial, any change of its position merely altering the time instant within the complete frame or raster scan when the signal peak in the output *n*-tuple or character feature indicating signal is available.

In similar manner and as shown in FIG. 3, if the initial signal waveform (*wf*2) and further version thereof delayed by 3.8 ms. (*wf*6) and 8.38 ms. (*wf*7) are multiplied together, the resultant *n*-tuple (*nt*2) indicates whether or not the examined character area contains the feature of an inclined limb sloping downwardly from right to left as defined by the areas *x*12, *x*8 and *x*2, FIG. 1. Again in like manner the existence of an acute angled corner as defined by the areas *x*5, *x*1 and *x*4 at the left of the numeral "2" in FIG. 1 can be established by multiplying together differently delayed versions of the output signal waveform as shown in FIG. 3 at diagrams *wf*8, *wf*9 and *wf*10 and the resultant *n*-tuple *nt*3. Other geometrical shapes or character features may be detected in similar manner, such as horizontal lines (areas *x*1, *x*4 and *x*10, FIG. 1), vertical lines (areas *x*15, *x*16, *x*17 or *x*19, *x*20, *x*21, FIG. 2) or downwardly convex hooks or curves (areas *x*25, *x*26, *x*27, FIG. 2).

In some circumstances, it is desirable to test for the specific absence of a character image in certain areas, such as at areas *x*22, *x*23, *x*24, FIG. 2 in order to differentiate between otherwise broadly similar character shapings such as the numerals 6 and 8 and 9. This may be achieved by the inclusion of an inverter circuit in one or more of the waveform supply paths to the multiplying means.

With the arrangements as described above and in said earlier applications, the identifying maxima or peak amplitude portions of the various *n*-tuple signals occur at instants during the raster scan cycle which are determined by the position within such scan cycle of the last of the chosen group of image areas, for instance, that of area *x*13 in the case of *n*-tuple *nt*1 and that of area *x*12 in the case of *n*-tuple *nt*2. In consequence, it was necessary with such earlier arrangements, to register each of the different *n*-tuple outputs separately in associated computer type storage means. Subsequently, in order to achieve recognition of the character identity, a program of computer operations was performed to effect successive examinations of different combinations of the stored *n*-tuple signals. Such examination program had to be performed for each scanning of the character field area and it was essential that the stored *n*-tuple signals were concerned with only one character and not with the respective left and right hand sections of two adjacent characters in a row of characters. This, in turn, required the various character areas of a succession of such areas to be at a constant (or at least previously known) pitch or spacing distance. Furthermore, in such earlier arrangements the stored *n*-tuple signals merely indicated the presence or absence of specific character feature and carried no information regarding the positioning of the feature with relation to the other identified features of the character.

Th present invention takes advantage of the information regarding the position of any identified character feature, relative to the character as a whole, which is implicit in the timing, within the scanning raster, of the character-feature indicating maxima of each *n*-tuple signal. Thus, referring to FIG. 3, it will be seen that the peak of the *n*-tuple *nt*1 occurs at the time 14.65 ms. from the commencement of the raster scan and coincident with the passage of the scanning light spot over the area *x*13, FIG. 1 whereas the similar peak of the *n*-tuple *nt*2 occurs at the earlier time 14.51 ms., coincident with the passage of the examining light spot over the area *x*12, FIG. 1, while the peak of *n*-tuple *nt*3 occurs at time 9.3 mc. coincident with the pasage of the light spot over the area *x*5, FIG. 1. By reason of the scan path pattern, delayed timing of any one *n*-tuple feature-indicating peak relative to another by an integral number of line scan times (1 ms.) represents horizontal shift whereas delayed timings which are fractions of one line scan time represent vertical shift upwards. Again, it is to be observed that it is only the relative difference of timing which is significant and that the actual timings within the scanning raster are immaterial.

If now, as shown at *nt*2′, FIG. 3, the *n*-tuple *nt*2 is delayed by the difference of timing, 0.1 ms., between itself and that of the *n*-tuple *nt*1, and as shown at *nt*3′ the *n*-tuple *nt*3 is likewise delayed by the difference of timing, 5.35 ms., between itself and that of the *n*-tuple *nt*1, the respective maxima will coincide in timing and, by application to combining means such as a coincidence gate of a multiplier circuit, will provided an output signal indicative of recognition of a particular character which not only has the three geometrical shape features detected respectively by the *n*-tuples *nt*1, *nt*2 and *nt*3 but which also has them in particular relative positions. The accuracy of recognition is accordingly enhanced while, by elimination of the separate storage of each *n*-tuple signal and subsequent computer operation cycle, identification is accelerated since each of the different *n*-tuple combinations needed to embrace a range of different characters can be dealt with simultaneously.

In practice, since the *n*-tuple waveforms will not have the idealised form as shown in FIG. 3 but will be subject to appreciable variation of amplitude and will have a considerable added noise signal component due to fluctuations of density of the printed character image and circuit noise, the conditions for obtaining a recognition signal output may be too stringent for practical use. For this reason it is desirable to extend the effective area, within the raster scan, of the various *n*-tuple signals before their application to the combining means for effecting character identification. Such extension or "blurring" clearly acts to reduce the necessary degree of conformity of each examined character to a particular style.

Such area extension involves increase of the signal peak duration to effect extension in the vertical or scan direction and repetition of the signal peak in the next adjacent scan line or possibly in several of such lines to effect extension in the horizontal direction, i.e. at right angles to the scan direction.

Figures 4, 5:
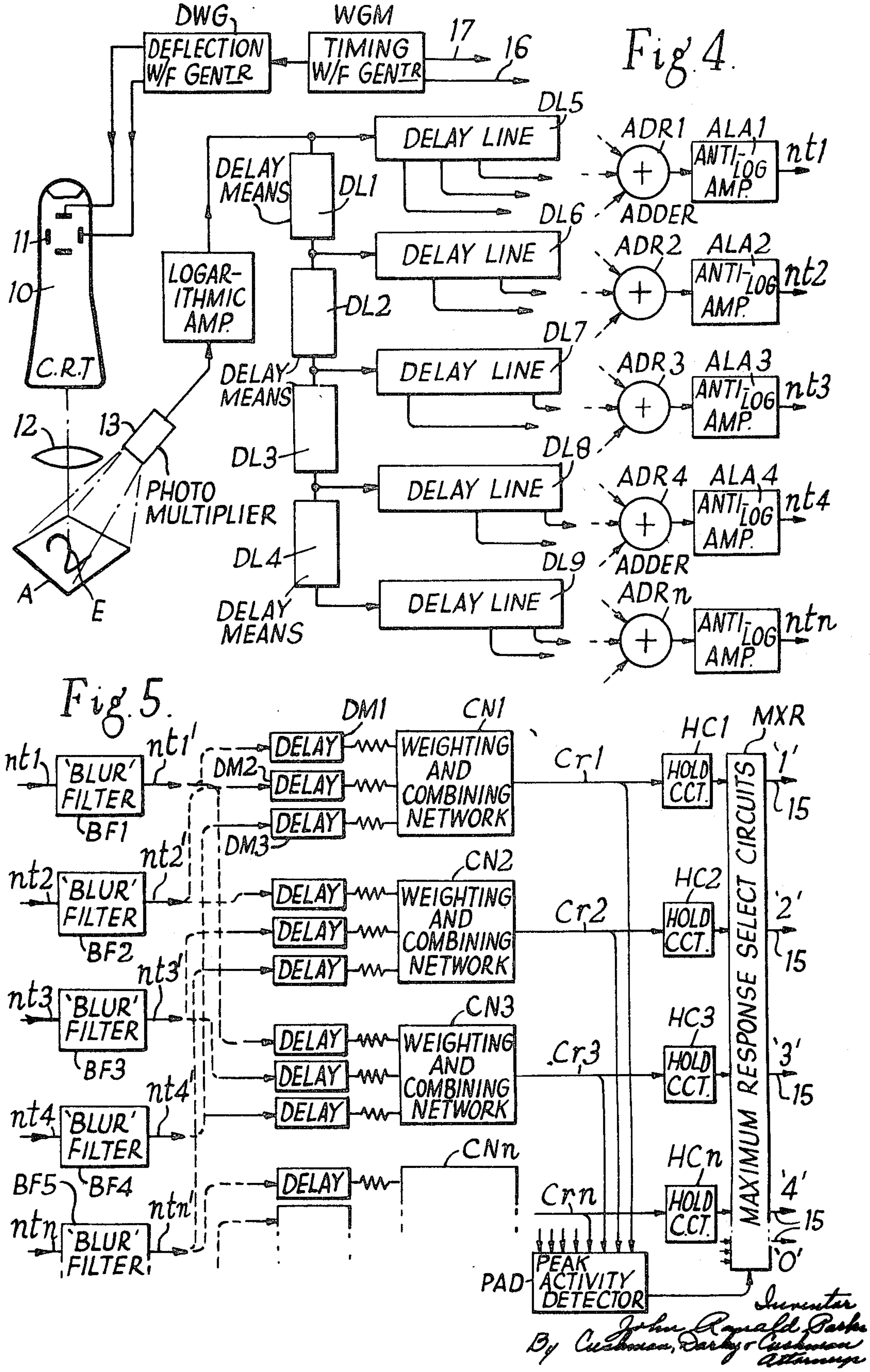
FIG. 4 is a block schematic diagram of one form of apparatus arrangement as described in said earlier applications for deriving the different $n$-tuple or character feature indicating signals.
FIG. 5 is a block schematic diagram illustrating an arrangement according to one form of the invention for determining the examined character identity from such $n$-tuple or character feature indicating signals.

Referring now to FIG. 4 of the drawings, this illustrates the initial *n*-tuple deriving section of one embodiment of the invention and which closely resembles the equivalent apparatus described in the aforesaid copending applications. The scanning means includes a cathode ray tube 10 whose electron beam is caused to execute the required raster scan movement by control voltages or currents supplied to the beam deflection means 11 of the tube from scan circuits in a deflection waveform generator DWG which may be of any convenient well known form and controlled in timing by timing signals from a timing waveform generator WGM also of conventional form. The light spot produced upon the screen of the cathode ray tube is projected by an optical system 12 on to the aforesaid examination field area A whereby the chosen pattern of parallel rectilinear scan lines is traversed by the focussed examining light spot E in the execution of each complete examination cycle.

The field area A is within the optical view of light sensing means 13, conveniently a photo multiplier tube, whereby the variations of light reflected from the examination area A during each scanning operation results in the generation of an analog form electric signal having a form as shown at *wf*1, FIG. 3 with variations of amplitude representing the image and background intensities within the area A. The signal output from the light sensing means, after amplification in an amplifier 14 having a logarithmic characteristic, is applied to a system of delay lines DL1, DL2, DL3, DL4 each having a signal delay time equal to an integral number, e.g. four, of complete line scan periods, i.e. forward line scan, plus fly-back. The output of each delay line and also the undelayed input to the first delay line DL1 is fed to an associated further delay line as shown at DL5, DL6, DL7, DL8 and DL9, each having a total delay time equal to one complete line scan period and each provided with one or more tappings thereon at points having selected and predetermined time delay values relative to the delay line input. The delay lines DL1 . . . DL4 are conveniently of the quartz type but the further delay lines DL5 . . . DL9 are preferably of any type by which the tapping points are readily adjustable. Such further delay lines may each comprise a length of delay line cable of the type which exhibits an external magnetic field when in use and with the tappings thereon in the form of inductive pick up coils of short axial length which can be slid along the cable to positions providing the required delay times.

As already explained previously and in greater detail in the aforesaid copending applications, the signal outputs from different combinations of the tappings on the delay lines DL5 . . . DL9 as required to detect the various character features are multiplied together. Since the signal amplitudes are of logarithmic form, this multiplication is simply effected by applying each combination group of delayed signals to a different one of a sereis of adder circuits ADR1, ADR2, ADR3, ADR4 . . . ADR*n*. The output from each of such adder circuits is then fed to an associated amplifier ALA1, ALA2, ALA3, ALA4 . . . ALA*n*, each having an anti-logarithmic characteristic whereby each amplifier output represents the product value of the selected and differently delays versions of the original input and forms an *n*-tuple signal *nt*1, *nt*2, *nt*3, *nt*4 . . . *ntn* indicative of the degree of existence within the examined field area A of a different one of the series of different geometrical shape features being sought.

Referring now to FIG. 5 of the drawings, which illustrates the basic elements of one arrangement according to the present invention, each derived *n*-tuple signal *nt*1 . . . *ntn* representing a different shape of character feature is applied to an associated spreading or "blur" filter means BF1, BF2, BF3, BF4 . . . BF*n* for expanding the effective area, relative to the raster scan, of the *n*-tuple response peak as already explained with reference to FIG. 3. Such "blur" filter means may comprise low-pass filters of the resistive/capacitive type. The "blurred" *n*-tuple signal outputs, *nt*1', *nt*2', *nt*3', *nt*4' . . . *ntn'* are then selected in accordance with the particular combination of character features appropriate to identify each different one of the range of characters capable of being recognised, the selected signals of each combination being applied to a separate combining means CN1, CN2, CN3 . . . CN*n* after passage through delay means, such as shown at DM1, DM2, DM3, whose respective time delay values are appropriate to bring about the required time coincidence of the *n*-tuple signal peaks as already explained with reference to waveform diagrams *nt*1, *nt*2' and *nt*3', FIG. 3. The combining means CN1 . . . may include suitable weighting networks to compensate for different degrees of significance of the *n*-tuple features within each character.

The output signals *cr*1, *cr*2, *cr*3 . . . *crn*, from the different combining means each represent by their amplitude the degree of correspondence of the examined character with the feature combination and relative positioning of such features called for by the *n*-tuple choice and the added delays of the related combining means CN1 . . . and the delay means DM1 . . . . The output signal *cr*1, *cr*2 . . . showing maximum amplitude constitutes the character-identifying signal.

Figure 7:
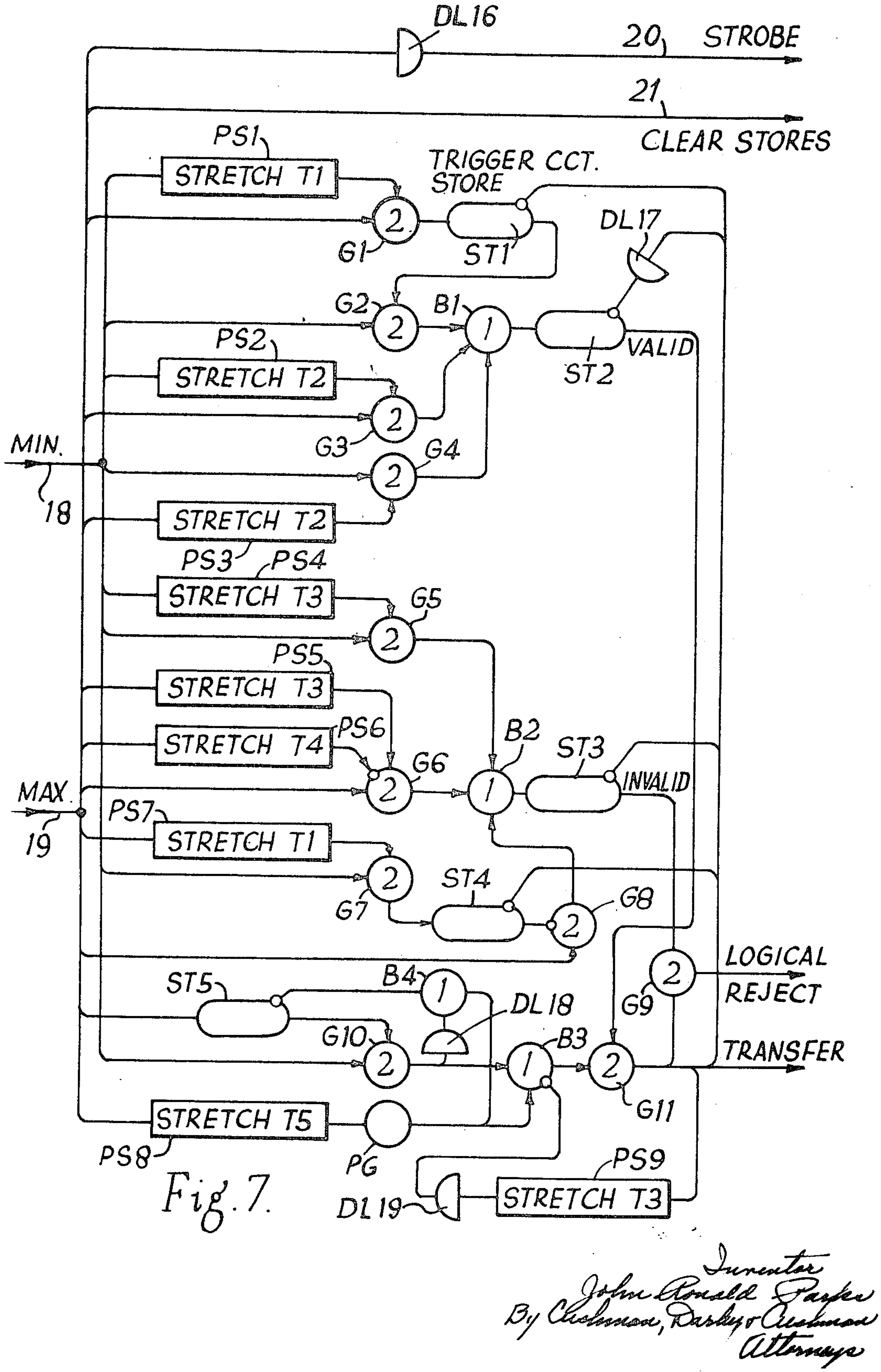
FIG. 7 is a detailed block schematic diagram of a validity checking arrangement forming part of the apparatus illustrated in FIG. 6.

To effect selection of such maximum amplitude signals and to control thereby the subsequent derivation of the appropriate character recognition signal, each of said signals *cr*1, *cr*2 . . . *crn*, equal in total number to the number of different characters within the range capable of being recognised, may be applied directly to a maximum response selection circuit MXR having a form similar to that described in said earlier application No. 447,180 with reference to the summing amplifier 58 and amplitude selection circuit 59 of FIG. 7 of such application. As in such earlier arrangement, under the control of a test or strobing pulse provided by the timing waveform generator WGM, FIG. 4 at the end of each complete scan cycle, the particular one of the signals *cr*1, *cr*2 . . . *crn*, showing an amplitude above a chosen level, is caused to operate an associated trigger circuit whose output energises the related character identification output conductor of the group 15. Such an arrangement employs a further pulse developed in the generator WGM to reset any operated trigger circuit before the next recognition operation and may include the further means as also described in such application to guard against double identification.

In a preferred form however, and as shown in FIG. 5, the various recognition signals *cr*1, *cr*2 . . . *crn* are each applied to a hold circuit HC1, HC2, HC3 . . . HC*n* and, collectively, to a peak activity detector PAD. The latter comprises means, such as biased diodes, for detecting when any one of the applied signals exceeds a chosen minimum or threshold value and therefrom providing an output test or strobe pulse to control the maximum response select circuit MXR. Each hold circuit comprises a capacitor which is charged by the input signal through a rectifier diode, the voltage on such capacitor, being that which is subsequently, at the time of the strobe pulse, examined and, if of the required amplitude, used to operate the related trigger circuit in the circuit MXR.

Figure 6:
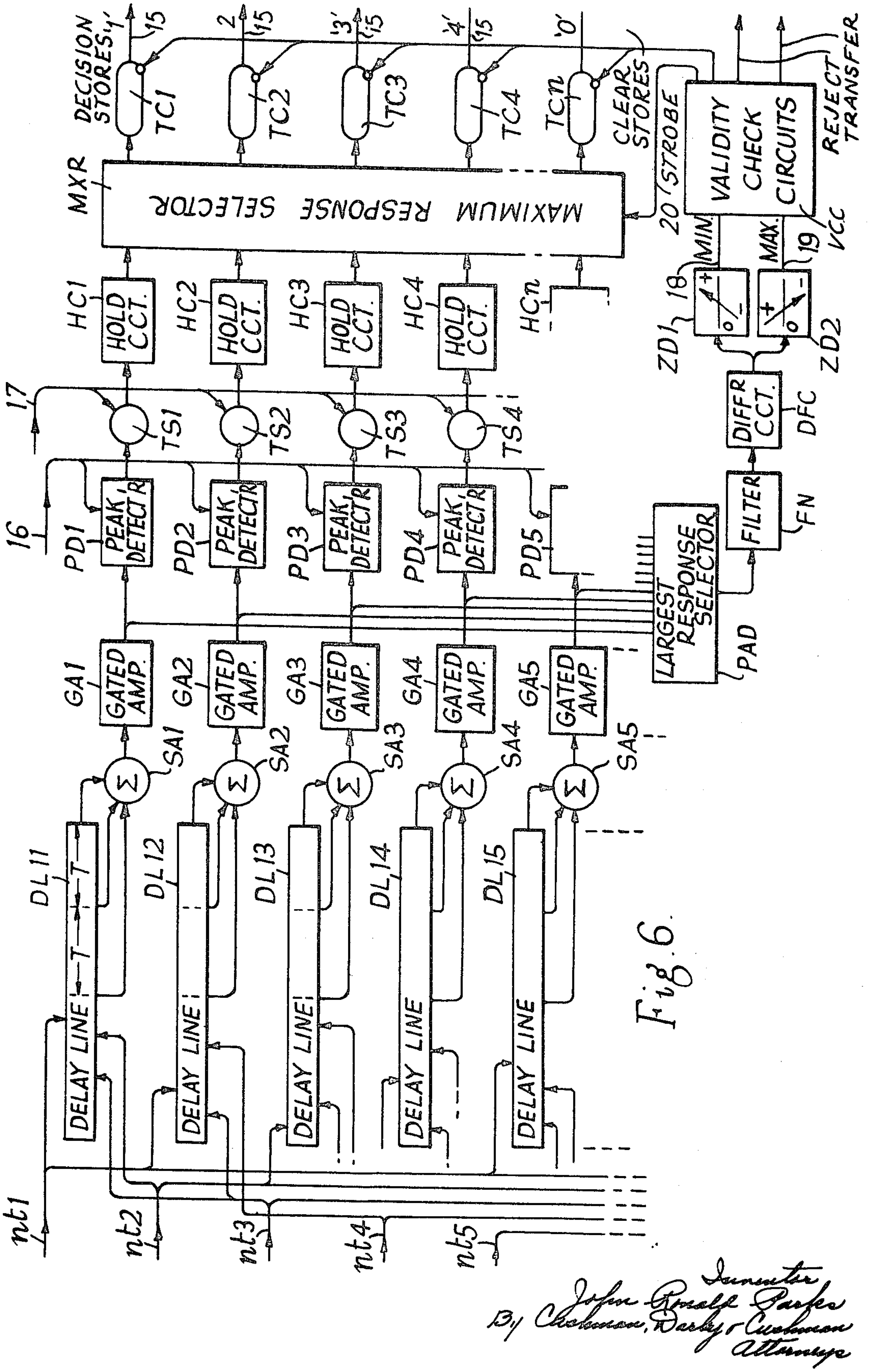

A preferred form of the general ararngement shown in FIG. 5, is illustrated in greater detail in FIG. 6. In this preferred arrangement the means for spreading or "blurring" the *n*-tuple signals and for adjusting their respective timings before combination are combined and take the form of a single delay line while an improved and more comprehensive system is provided for checking the validity of any identification output obtained.

The various features indicating *n*-tuple signals *nt*1, *nt*2, *nt*3 . . . are selected as already described in the combinations appropriate to recognition of the different characters. The signals of each combination are applied to suitably displaced input tappings on delay lines DL11, DL12, DL13, DL14 . . . whereby, at the output end of the line, they have the correct relative timing to establish coincidence of the signal peaks therein, if present. Blurring in the vertical or scan direction is achieved by limiting the response band width of the delay line while, to effect blurring in the horizontal direction, i.e. at right angles to the scan direction, each delay line is provided with at least two additional output tappings which are separated from the line end and each other by a delay time equal to one complete line scan.

The several outputs from each delay line are then fed to a summing circuit SA1, SA2, SA3 . . . and the respective outputs from each of these is then applied to a gated amplifier GA1, GA2, GA3, GA4 . . . which is controlled by a signal derived from the timing waveform generator WGM to be operative only during that portion of a line scan in which a valid $n$-tuple response can occur. It is necessary to avoid use of any signals which may occur during or near fly-back.

The output from each gated amplifier GA1, GA2 . . . is applied to the input of an associated peak detector circuit PD1, PD2 . . . . Such peak detector circuits each comprise a capacitor which is arranged to be charged by the input signal through a series rectifier and a discharge path for discharging such capacitor at the end of each line fly-back time by way of a normally-open diode or transistor switch controlled by pulse signals supplied over lead 16 from the timing waveform generator WGM.

The output from each peak detector PD1, PD2 . . . is applied by way of a normally-open associated diode or transistor switch TS1, TS2, TS3, TS4 . . . to the related hold circuit HC1, HC2, HC3, HC4 . . . . The switches TS1, TS2 . . . are arranged to be closed momentarily at the beginning of each line flyback time by control pulses supplied over lead 17 from the timing waveform generator WGM thereby to transfer the voltage then standing in the associated peak detector to the related hold circuit and so allow the former to be discharged in readiness for similar operation during the next line scan time while leaving the peak voltage available for investigation by the maximum response selector MXR.

The respective outputs from the hold circuits HC1, HC2 . . . are connected to the related inputs of the maximum select circuit MXR which, as in the case of the arrangements of FIG. 5 already referred to, may be of the general form described with relation to the earlier application No. 447,180. In the present embodiment however the controlling strobe pulses, instead of being derived directly from the peak activity detector PAD, are obtained from a system of validity checking circuits VCC whose form will be described later.

The various, individually selectable, outputs of the maximum response selector MXR are connected to the triggering input terminals of related trigger circuit storage devices TC1, TC2, TC3 . . . TC$n$, one for each character of the recognisable range. The trigger circuit outputs constitute the character identification output leads 15 for application to display, paper tape punch or other utilisation means. The reset input of each trigger circuit TC1 . . . is supplied with a "clear stores" pulse signal also derived from the validity check circuit VCC.

The largest response selector PAD causes the transmission of that one of the recognition signals $cr1$, $cr2$ . . . $crn$, which has the largest amplitude through a low pass filter network FN having a time constant of several line periods in order to remove transient variations to a differentiating circuit DFC. The differentiated output signal from this circuit is then applied to two zero detectors ZD1, ZD2 which may comprise Schmitt trigger circuit devices. One zero detector ZD1 provides a MIN output signal when the input passes through zero from negative to positive value, indicative of a minimum in the smoothed wave input to the differentiator while the other zero detector ZD2 provides a MAX output signal when the input passes through zero from positive to negative, indicative of a peak in such smoothed wave. The latter instant is clearly the most suitable time to sample the character response whereas the former indicates the least match which can be taken to correspond to the gap between characters.

FIG. 7 illustrates in block schematic form the detailed arrangement of the validity check circuit VCC of FIG. 6. Such arrangements comprise input leads 18, 19 for receiving the MIN and MAX signals from the zero detector circuits ZD1, ZD2 respectively.

The means for operation in the derivation of a "valid" decision are as follows. The strobe output waveform on lead 20 for controlling the maximum response selector MXR is derived from the MAX waveform through a delay circuit DL16 while the CLEAR STORES waveform on lead 21 is a direct version of the MAX input. the MIN input is applied to a pulse stretching or lengthening circuit PS1 operating to extend the length of any input pulse by a time interval T1 equal to the time interval required to scan the largest character of the range being dealt with. The output from this stretch circuit PS1 is applied as one input of a coincidence gate G1 whose other controlling input is the MAX waveform. The gate output provides a triggering input to a trigger circuit ST1 operating as a store. The output from the trigger circuit forms one input of a further coincidence gate G2 whose second controlling input is the MIN waveform. The gate output forms one input, through a buffer or "OR" circuit B1, to a further trigger circuit store ST2. The MIN waveform is also applied to a second pulse stretch circuit PS2 operating to extend any pulse input by a time interval T2 which is equal to 2T1/3. The output from this stretch circuit PS2 forms one input to a further coincidence gate G3 whose second controlling input is the MAX waveform. The output from this gate circuit G3 forms an alternative trigger input for the trigger circuit ST2 through the buffer B1. A third pulse stretching circuit PS3 is supplied with the MAX waveform. This circuit has the same pulse extension time T2 as that of the circuit PS2 and its output forms an input to a further coincidence gate G4 whose other controlling input is the MIN waveform. The output from this gate circuit G4 forms a third alternative triggering input for the trigger circuit ST2 through buffer B1. The output from the trigger circuit ST2 constitutes the VALID waveform and is used as described later to control the emission of a TRANSFER signal indicating that the energized one of the decision store leads 15, FIG. 6, provides an acceptable recognition. Each of the trigger circuit stores ST1 and ST2 are each reset by the emitted transfer signal, the store ST1 being reset first owing to the inclusion of a further delay DL17 in the resetting input to store ST2.

The means for dealing with the conditions leading to an invalid decision comprise a further pulse stretch circuit PS4 supplied with the MIN waveform. This circuit PS4 has a pulse lengthening time T3 equal to the time required to scan the narrowest of the characters capable of being recognized. The output from this stretch circuit forms one input to a coincidence gate G5, whose other controlling input is also the MIN waveform. The output from this gate circuit G5 provides one of three alternative triggering inputs to a third trigger circuit store ST3 through a buffer circuit B2. The MAX waveform is also applied to a further pulse stretch circuit PS5 having the same pulse extension time T3. The output from this stretch circuit forms one input for two input coincidence gate G6 whose other input is also the MAX waveform. This gate circuit also has an inhibit input and this is supplied with the MAX waveform through a further pulse stretch circuit PS6 whose extension time T4 is equal to T3/3. The output from the gate circuit G6 provides a second input to the trigger circuit store ST3 through the buffer B2. A further pulse stretching circuit PS7 having the pulse lengthening time T1 as already defined is supplied with the MAX waveform and has its output applied to one input of a coincidence gate G7, whose other controlling input is the MIN waveform. The gate output provides the triggering input to a further trigger circuit store ST4 whose output forms an inhibit controlling input of a further gate G8 whose other controlling input is the MAX waveform. The output from this gate forms a third triggering input through the buffer B2 for the trigger circuit store ST3. The output from the trigger circuit ST3, which constitutes the INVALID waveform is applied to a further coincidence gate G9, whose other controlling input is the TRANSFER signal, the gate output providing the LOGICAL REJECT signal. The trigger circuits ST3 and ST4 are each reset by the transfer signal.

The transfer logic arrangements comprise a trigger circuit store ST5 whose triggering input is the MAX waveform and whose output forms one controlling input for a coincidence gate circuit G10, the other controlling input of which is the MIN waveform. The gate output is applied through an OR gate or buffer B3 to a coincidence gate circuit G11 controlled also by the VALID waveform already mentioned. The output from such gate circuit forms the TRANSFER signal. The output of gate G10 is also fed through a delay DL18 and buffer B4 to form one reset signal for the trigger circuit store ST5. The MAX signal is also fed through a further pulse stretching circuit PS8 having an extension time T5 equal to 2T3/3. The output from this stretch circuit PS8 is fed to a rectifier/differentiator PG to derive a pulse coincident with the end of the stretched input to form a second resetting signal for the trigger circuit ST5 through the buffer B4 and an alternative input to the gate G11 through the buffer B3. Such buffer or OR gate B3 has an inhibit input which is supplied with the TRANSFER signal waveform through a pulse stretching circuit PS9, having the extension time T3 as already defined, and a further delay DL19.

In the operation of such validity check circuit, a valid decision, indicated by active level of the TRANSFER signal, is provided (a) if two minima enclosing a maximum response occur within an interval related to the maximum character dimension; (b) if a maximum is followed by a minimum within a given interval corresponding to about two-thirds of the largest character dimension, or (c) if a minimum is followed by a maximum within the same interval.

A decision of invalidity is given (a) if two minima occur closer together than an interval related to the minimum character separation; (b) if two maxima occur within an interval related to the minimum character dimension but not within an interval time equal to one third of such minimum character dimension, or two maxima occur separated by an interval related to the maximum character dimension but without any intervening minimum.

The TRANSFER signal is used to indicate to further utilisation means that the state of the decision stores TC1, TC2 . . . (FIG. 6) is ready to be transferred and is provided when a minimum follows a maximum, at a fixed time, equivalent to two thirds of a minimum character width, after the most recent maximum, and if the previous transfer occurred no more recently than an interval related to the minimum character dimension.

The nature of the decision in such further utilisation means is transfer only if the condition is regarded as valid and there is no LOGICAL REJECT signal. Only one decision store TC1 . . . TC6, is active. Under all other conditions a reject is indicated.

Various modifications may be made without departing from the invention. For instance the use of additional delay means, such as the delays DM1 . . . or DL11 . . . of FIGS. 5 or 6 subsequent to the formation of each feature indicating *n*-tuple signal can be avoided by so choosing the delay line tappings used in the formation of such *n*-tuples that the response peaks of the latter all occur with a common timing when a particular character is being examined.

In effecting horizontal shift of any derived *n*-tuple in order to achieve the required time coincidence of the response peaks in the formation of the recognition signal for a particular character, the use of a delay line is normally impracticable if a shift of more than a few spacing dimensions is required. For greater amounts of horizontal shift it is preferable to replicate the required feature indicating *n*-tuple from a different series of positions on the initial delay means.

In the embodiment of FIG. 6, the largest response selector PAD conveniently has a form resembling that of the circuit 59 of FIG. 7 of the aforesaid earlier application No. 447,180 but with the tail transistor 85 biased for continuous conduction instead of control by the pulse input on lead 72 and with the signal output to the subsequent filter taken from across the emitter resistor 86.

I claim:

1. Apparatus for effecting recognition of printed characters which comprises means for examining a predetermined field area containing the character to be recognized by scanning movement of a spot-form examination area along a raster-like scan path of parallel and equispaced lines, means for developing an analogue form electric signal waveform representing the differing optical characteristics of the examined character and background areas along said scan path, and a plurality of separate auto-correlation means each arranged to effect auto-correlation of the signals representing different positions along the scan path by multiplying together at least two versions of said analogue signal after delaying one signal with respect to the other by a predetermined amount each of said auto-correlation means being arranged to provide an output *n*-tuple signal indicative of the presence or absence within the examined field area of a particular one of a number of character features of different geometrical shape, in which a plurality of means are provided for combining different combinations of said feature indicating *n*-tuple signals, each of said combining means being supplied with the particular feature indicating *n*-tuple signals which relate to the character features present in a different one of the range of characters capable of being recognized and the timing, relative to one another, of such *n*-tuple signals as supplied to each of said combining means being such that an output character identifying signal is provided from such combining means only when the examined character exhibits each of the chosen character features in the correct physical disposition relative to the other features.

2. Apparatus according to claim 1 including additional delay means in which the *n*-tuple signals applied to each of said means for comparing combinations of *n*-tuple signals are adjusted in relative timing by passage of at least one of such signals through said additional delay means.

3. Apparatus according to claim 1 which includes means for spreading or blurring the response peaks of each of the *n*-tuple signals prior to application to said means for comparing combinations of said *n*-tuple signals.

4. Apparatus according to claim 3 in which said spreading or blurring means includes in the signal transmission path for each *n*-tuple signal a signal transmission component having a band-limited low pass frequency characteristic.

5. Apparatus according to claim 3 which comprises means for introducing repetitions of each *n*-tuple signal having a time difference equal to an integral number of complete line scan intervals, to said means for comparing combinations of said *n*-tuple signals.

6. Apparatus according to claim 1 which comprises for each of said means for comparing *n*-tuple signals a common delay line having a plurality of time-spaced input terminals to each of which is supplied a different one of said *n*-tuple signals.

7. Apparatus according to claim 6 in which said common delay line is provided with a plurality of output tappings time spaced by intervals equal to one complete scan line time and in which signals from each of said output tappings are applied as separate inputs to a signal summing device.

8. Apparatus according to claim 1 which includes decision means supplied with each of the output character recognition signals from the different *n*-tupal signal comparison means, said decision means comprising signal amplitude examining and selecting means to select that input recognition signal which is of greater amplitude as a character identifying output signal.

9. Apparatus according to claim 8 in which said decision means includes circuit means controlled by an applied first control signal for rendering it operative and in which such control signal is derived from maximum amplitude selector means supplied with each of said derived character recognition signals and arranged to transmit that one of said recognition signals having the largest amplitude response content to means of generating said first control signal in time dependence upon the maximum response signal peak therein.

10. Apparatus according to claim 9 which comprises a differentiating circuit connected for supply with said selected maximum amplitude signals and a first zero detector circuit connected to be supplied with the output from said differentiating circuit, said zero detector circuit being operative to detect each transition of said differentiated signal through zero in a given direction of polarity change indicative of a response peak in said maximum amplitude signal and therefrom to provide an output signal as said control signal.

11. Apparatus according to claim 10 which includes means for checking the validity of any derived identification signal from said decision means.

12. Apparatus according to claim 11 which includes a second zero detector circuit connected to be supplied with said output from said differentiating circuit, said second zero detector circuit being operative to detect each transition of said differentiated signal through zero in a direction of polarity change opposite to that of said first zero detector circuit indicative of a response minimum in said maximum amplitude signal and therefrom to provide a second control signal.

13. Apparatus according to claim 12 in which said decision means comprises circuit means for comparing the time spacing between successive ones of said first and second control signals with relation to the raster scan time and reject signal generating means controlled by said time comparing means for generating a reject signal when the time spacing values be outside predetermined limits.

References Cited

UNITED STATES PATENTS

| | | | |
|---|---|---|---|
| 3,011,152 | 11/1961 | Eckdahl | 340—146.3 X |
| 3,092,809 | 6/1963 | Merritt et al. | 340—146.3 |
| 3,196,399 | 7/1965 | Kamentsky et al. | 340—146.3 |

MAYNARD R. WILBUR, Primary Examiner

M. K. WOLENSKY, Assistant Examiner